US006065357A

United States Patent [19]

Shahaf et al.

[11] Patent Number: 6,065,357

[45] Date of Patent: *May 23, 2000

[54] SYSTEM AND METHOD FOR COUNTING THE NUMBER OF BOARDS WITHIN A STACK

[75] Inventors: Amit Shahaf, Mobile Post Oshrat; Ernest Grimberg, Kiriat Bialik, both of Israel

[73] Assignee: Opsigal Control Systems Ltd., Carmiel, Israel

[ * ] Notice: This patent issued on a continued prosecution application filed under 37 CFR 1.53(d), and is subject to the twenty year patent term provisions of 35 U.S.C. 154(a)(2).

[21] Appl. No.: 09/010,625

[22] Filed: Jan. 22, 1998

[30] Foreign Application Priority Data

Jan. 22, 1997 [IL] Israel ........................................ 120054

[51] Int. Cl.[7] .................................................... G01M 19/00

[52] U.S. Cl. ............................................. 73/865.8; 73/159

[58] Field of Search .................................. 73/865.8, 159; 271/4.01

[56] References Cited

U.S. PATENT DOCUMENTS

| | | | |
|---|---|---|---|
| 3,790,759 | 2/1974 | Mohan et al. . | |
| 3,835,306 | 9/1974 | Bills et al. . | |
| 3,971,918 | 7/1976 | Saito . | |
| 4,029,216 | 6/1977 | Adams et al. | 214/1 BB |
| 4,225,931 | 9/1980 | Schwefel . | |
| 4,323,768 | 4/1982 | Uchida | 271/95 |
| 4,384,195 | 5/1983 | Nosler . | |
| 4,417,351 | 11/1983 | Williamson et al. . | |
| 5,040,196 | 8/1991 | Woodward . | |
| 5,534,690 | 7/1996 | Goldenberg et al. . | |
| 5,581,353 | 12/1996 | Taylor | 356/381 |

FOREIGN PATENT DOCUMENTS

| | | |
|---|---|---|
| 0-743-616-A2 | 11/1996 | European Pat. Off. . |
| 0 855 676 A1 | 7/1998 | European Pat. Off. . |
| WO 89/04021 | 5/1989 | WIPO . |
| WO 91/10972 | 7/1991 | WIPO . |

*Primary Examiner*—Max Noori
*Attorney, Agent, or Firm*—McDermott, Will & Emery

[57] ABSTRACT

A system for determining the number of boards within a stack of boards, each board having a characteristic configuration, is provided. The system includes an imaging device attached to a moveable carriage, the imaging device being actuated to move to image the stack of boards and a processing unit, coupled to the imaging device, for identifying the characteristic configuration of each of the stack of boards from the scanned images.

18 Claims, 4 Drawing Sheets

SYSTEM AND METHOD FOR COUNTING THE NUMBER OF BOARDS WITHIN A STACK

FIELD OF THE INVENTION

The present invention relates to the manufacture of corrugated boards generally and in particular, to the accurate assessment of the number of boards finally produced.

BACKGROUND OF THE INVENTION

Corrugated boards are generally produced on an automated line in which web guiding systems are commonly used to correctly guide and tension the material on the web. Since the board material which is guided in web form is generally thin, there is a tendency for the material to wander from its correct alignment on the web. Other factors, such as material irregularity, web speed or faulty machinery, are also liable to lead to a percentage of the manufactured boards being sub-standard. Generally, these sub-standard boards are removed during the production process. Generally, the corrugated boards are stacked in piles of several hundred, commonly 400 boards per stack.

Reference is now made to FIG. 1 which illustrates three stacks, designated 10A, 10B and 10C, of manufactured boards 12 being conveyed together along the corrugated board production line, generally designated 1. Each of the stacks contains a plurality of corrugated boards 12, laid one on top of each other. In the typical example, shown in FIG. 1, stack 10A contains more boards than stack 10B and stack 10C contains more boards than 10A.

An enlarged detail of the top of stacks 10A and 10B is shown in FIG. 2, to which reference is now made. The top rows of the corrugated boards are referenced 14, 16, 18 and 20 in stack 10A, and 22 and 24 in stack 10B. Stack 10A contains two extra boards, 14 and 16. Boards 18 and 20 of stack 10A are aligned with boards 22 and 24 of stack 10B.

During manufacture, the width of the boards may vary, as exaggerately illustrated in FIG. 2, so that board 16 is narrower than boards 14 and 18, for example.

The depth of each corrugated board may vary so that it is not possible to measure the total height of a stack in order to calculate the number of boards contained therein.

Since sub-standard boards are removed during the production process from any or all of the stacks, the final number of boards in each stack will vary and furthermore, the manufacturer cannot easily determine their number. Since the purchaser is paying for a stack of 400, say, any shortfall is made up by the manufacturer. Usually, manufacturers add 10–20 extra boards to each pack to satisfy the purchaser. This over-compensation by the manufacturer is inefficient and costly.

The applicant has realized that since each corrugated board has a characteristic but distinctive "wave corrugation", it is possible to determine the number of boards in a stack by counting the number of "wave corrugations". One possible system, illustrated in FIG. 3, utilizes a camera 30 together with a parabolic reflector 32 to "scan" a stack 34 of corrugated boards 36. However, it was found that in order to scan the whole stack, the camera has to be placed far away from the stack. The resultant resolution was too low to accurately determine the number of boards.

An alternative configuration used a plurality of cameras, each of which scanned a portion of the stack. For example, it was found that to obtain a high enough resolution, each camera could only scan 40 boards. Since, the standard stack contains approximately 400 boards, ten cameras would be needed. In addition to being costly, it is difficult to ascertain where each camera begins and ends its "scan". To overcome the problem of scan overlap, a "laser" pointer is additionally required.

The previous embodiments have the further disadvantage in that the line must be stationary at the time the scan takes place.

SUMMARY OF THE INVENTION

An object of the present invention is to provide a method and system for accurately ascertaining the number of corrugated boards produced which overcomes the limitations and disadvantages of existing systems.

A further object of the present invention is to provide a method and system for accurately ascertaining the number of items within a stack of items whether static or moving on a production line.

A yet further object of the present invention is to accurately ascertaining the number of items within each of a plurality of a stack of items, adjacent to each other.

There is thus provided, in accordance with a preferred embodiment of the present invention, a system for determining the number of boards within a stack of boards, each board having a characteristic configuration. The system includes an imaging device attached to a moveable carriage, the imaging device being actuated to move to image the stack of boards and a processing unit, coupled to the imaging device, for identifying the characteristic configuration of each of the stack of boards from the scanned images.

Additionally, there is provided, in accordance with a preferred embodiment of the present invention, a system for determining the number of boards within each of a plurality of stacks of boards adjacent to each other, each board having a characteristic configuration. The system includes an imaging device attached to a moveable carriage, the imaging device being actuated to move to image the proximate stack of boards, a processing unit, coupled to the imaging device, for identifying the characteristic configuration of each of the imaged stack of boards and a height sensor coupled to the processing unit, for determining the height of each of the plurality of stacks of boards.

Furthermore, in accordance with a preferred embodiment of the present invention, the stack of boards are moving along a production line.

Furthermore, in accordance with a preferred embodiment of the present invention, the boards are corrugated boards and the common characteristic configuration is a sine-wave.

Additionally, in accordance with a preferred embodiment of the present invention, the movement of the imaging device is coordinated with the movement of the production line. The movement of the imaging device is generally perpendicular to the stack of boards.

Furthermore, in accordance with a preferred embodiment of the present invention, the height sensor is an ultrasonic sensor or a laser displacement sensor.

Furthermore, in accordance with a preferred embodiment of the present invention, the imaging device is a charge coupled device (CCD) camera.

Additionally, there is provided, in accordance with a preferred embodiment of the present invention, a method for determining the number of boards within a stack of boards, each board having a common characteristic configuration. The method includes the steps of:

a) imaging the stack of boards; and b) identifying the characteristic configuration for each of the imaged stack of boards.

This method further includes the step of measuring the height of the imaged stack of boards.

Furthermore, there is provided, in accordance with a preferred embodiment of the present invention, a method for determining the number of boards within each of a plurality of stacks of boards adjacent to each other, each board having a common characteristic configuration. The method includes the steps of:

a) imaging the stack of boards, proximate to the imaging device;

b) identifying the characteristic configuration for each of the imaged stack of boards;

c) counting the number of boards within the imaged stack of boards;

d) measuring the height of each of the plurality of stacks of boards; and e) comparing the measured heights of each of the plurality of stacks of boards to count the number of boards within each of the adjacent stacks of boards.

BRIEF DESCRIPTION OF THE DRAWINGS

The present invention will be understood and appreciated more fully from the following detailed description taken in conjunction with the appended drawings in which.

DETAILED DESCRIPTION OF THE PRESENT INVENTION

The applicant has realized that it is possible to accurately determine the number of corrugated boards in a stack on a moving production line by utilizing a single movable imaging device to scan the line.

Figure 4:
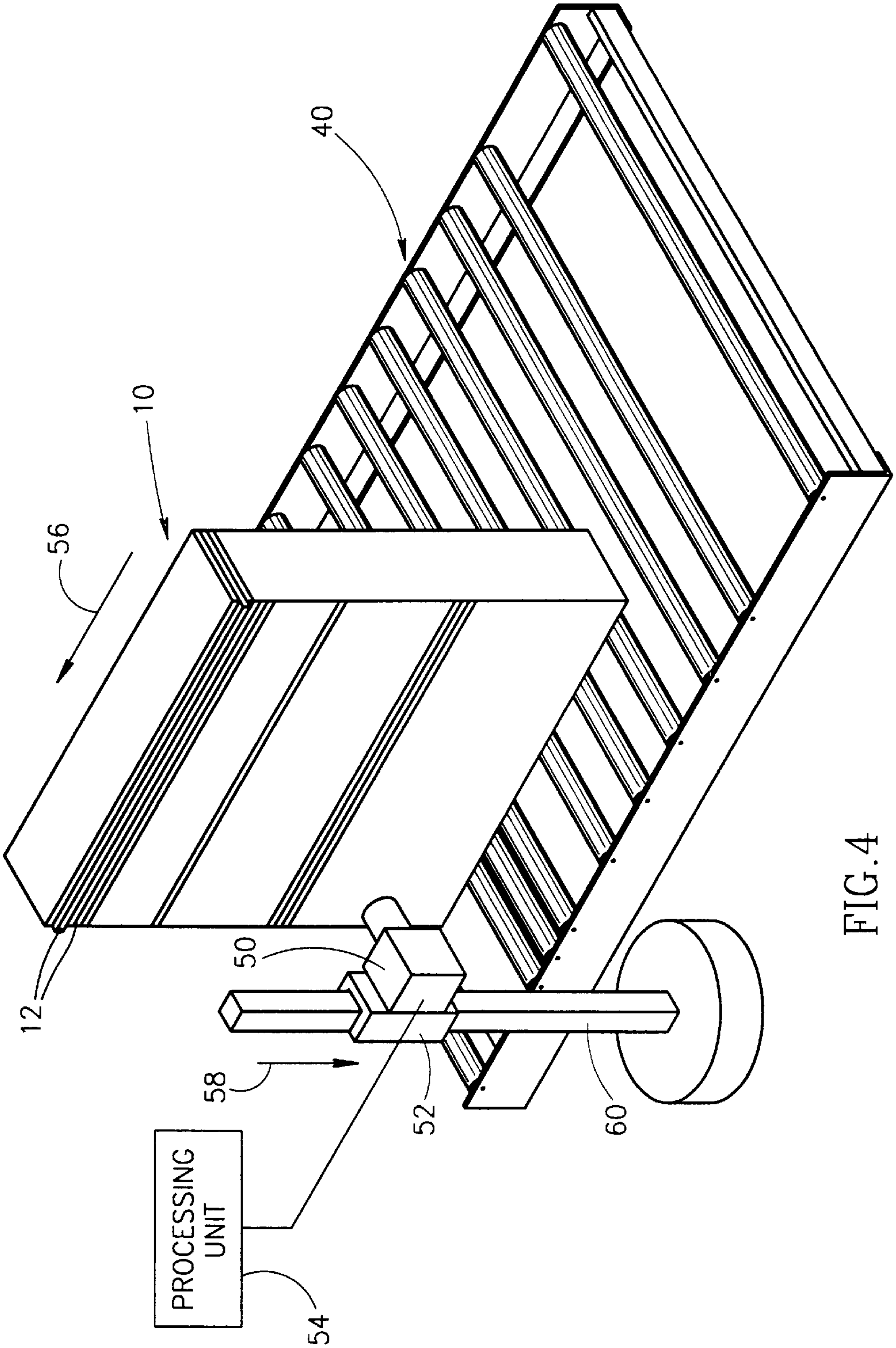
FIG. 4 is a generally isometric illustration of a system for determining the number of corrugated boards on a moving production line, constructed and operative in accordance with a preferred embodiment of the present invention.

Reference is now made to FIG. 4 which is a generally isometric illustration of a system for determining the number of corrugated boards on a moving production line, generally referenced 40, constructed and operative according to a preferred embodiment of the present invention.

The production line 40 comprises a stack 10 of manufactured boards. The stack 10, which is similar to the stack 10A, described hereinabove with respect to FIG. 1, contains a plurality of manufactured boards 12.

The board counting system comprises an imaging device 50, attached to a moveable carriage 52 and a processing unit 54 coupled to the imaging device 50. Production line 40 moves in a generally longitudinal direction, indicated by arrow 56.

The moveable carriage 52 is suitably attached to a stand 60 which allows the moveable carriage 52 to move in a generally vertical direction, indicated by arrow 58, that is perpendicular to the movement of the boards.

The imaging device 50 scans the boards as the production line 40 moves across (arrow 56) the camera's field of view. The imaging device 50 is initially set in line with the top of the stack 10 and as the imaging device 50 scans the stack of boards, the carriage 52 is actuated to move downwards (arrow 58). Imaging device 50 initially images the characteristic "wave" of the leftmost edge of the top board stack 10. The movement of imaging device 50 is coordinated with the movement of the production line 40, so that the imaging device 50 scans the stack of boards from top to bottom during the time it takes for the stack of boards to move across the imaging device, thereby ensuring that all the boards are scanned. At the end of the scan, imaging device 50 images the rightmost edge of the bottom board.

Processing unit 54 processes the scanned data received from imaging device 50 and by identifying the waveform of the corrugated boards computes the number of boards within the stack.

Imaging device 50, which is preferably any suitable CCD (charge coupled device) camera, known in the art, transmits the images scanned to processing unit 54.

The processing unit 54 comprises a suitable computer arrangement, known in the art, such as a PC (personal computer) having memory, storage input and display monitor capabilities.

As previously described hereinabove, the corrugated boards 12 have a distinctive "wave" shape when viewed from the front. Each wave represents a single board 12. By vertically scanning a stack of boards, the change ins image represented by the scanning of the wave can be specifically identified. Processing unit 54 converts the scanned waves into a number of boards. The number of boards can be displayed on the attached monitor.

For the purposes of example only, and without being in any way limiting to the invention, an imaging device moving at a rate of 1–2 meters per minute can scan a standard stack of approximately 400 corrugated boards (having a length of approximately 2 meters), traveling on a line moving at a rate of 1–2 meters per second in less than 2 seconds.

Since the imaging device 50 can move in a vertical direction and is able to scan any stack height, the imaging device 50 can be located close to the production line 40 thus allowing for a high resolution scan of the image.

Figure 5:
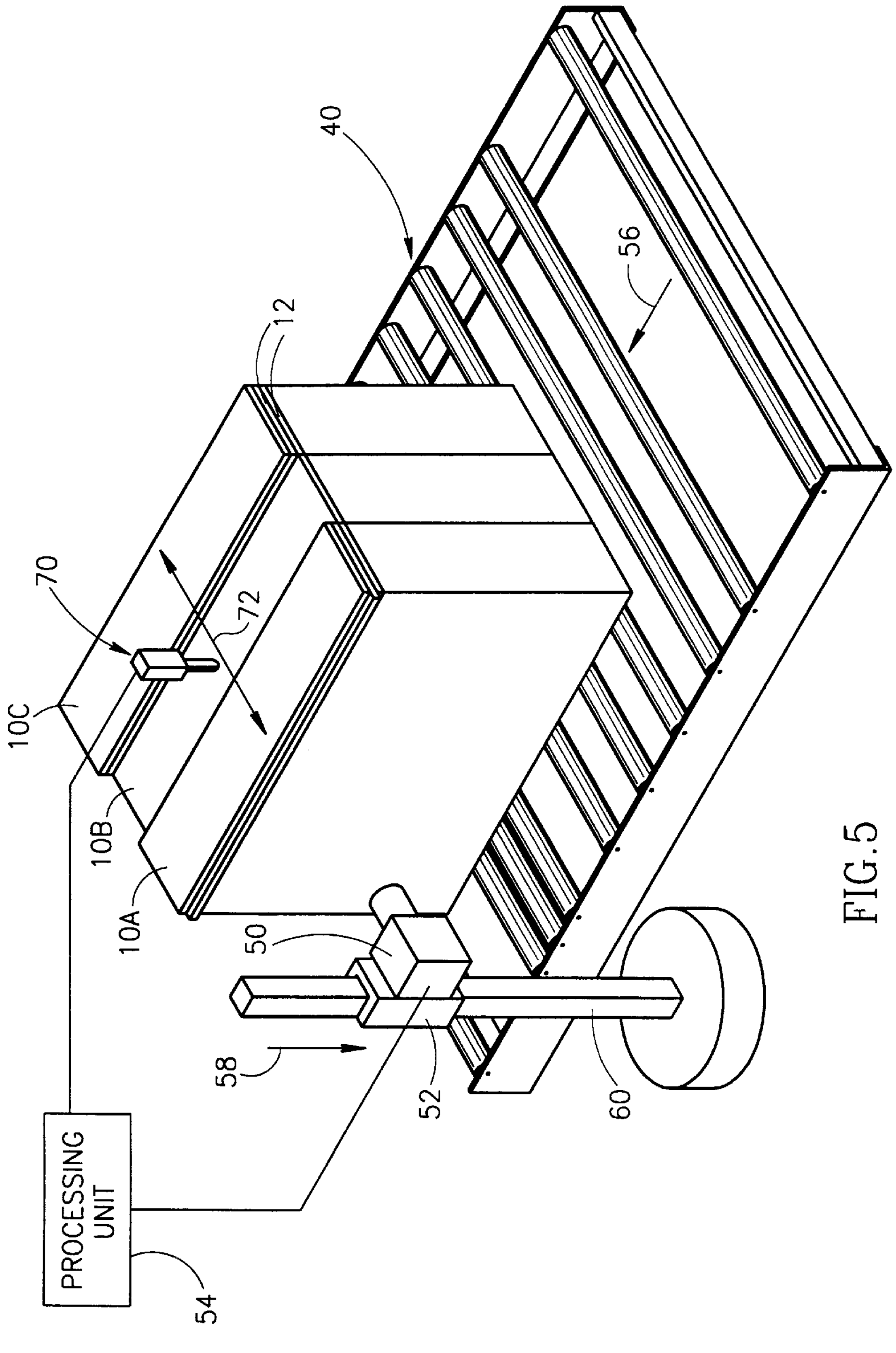
FIG. 5 is a generally isometric illustration of a system for determining the number of corrugated boards on a moving production line constructed and operative according to a further preferred embodiment of the present invention.

Reference is now made to FIG. 5 which is a generally isometric illustration of a further embodiment of a system for determining the number of corrugated boards on a moving production line, constructed and operative according to a preferred embodiment of the present invention.

Figure 1:
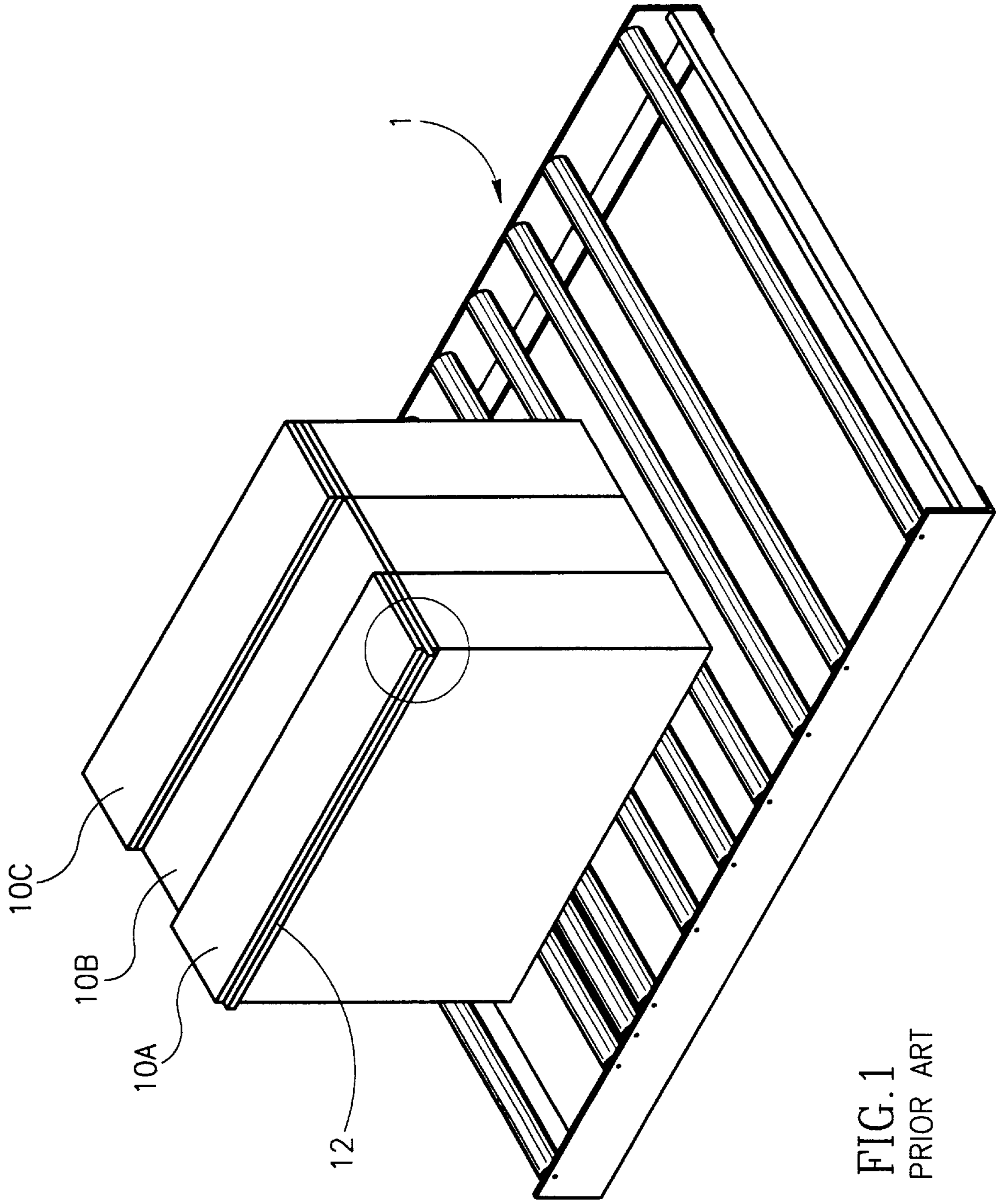
FIG. 1 PRIOR ART
FIG. 1 is a schematic isometric illustration of manufactured corrugated boards.
Figure 2:
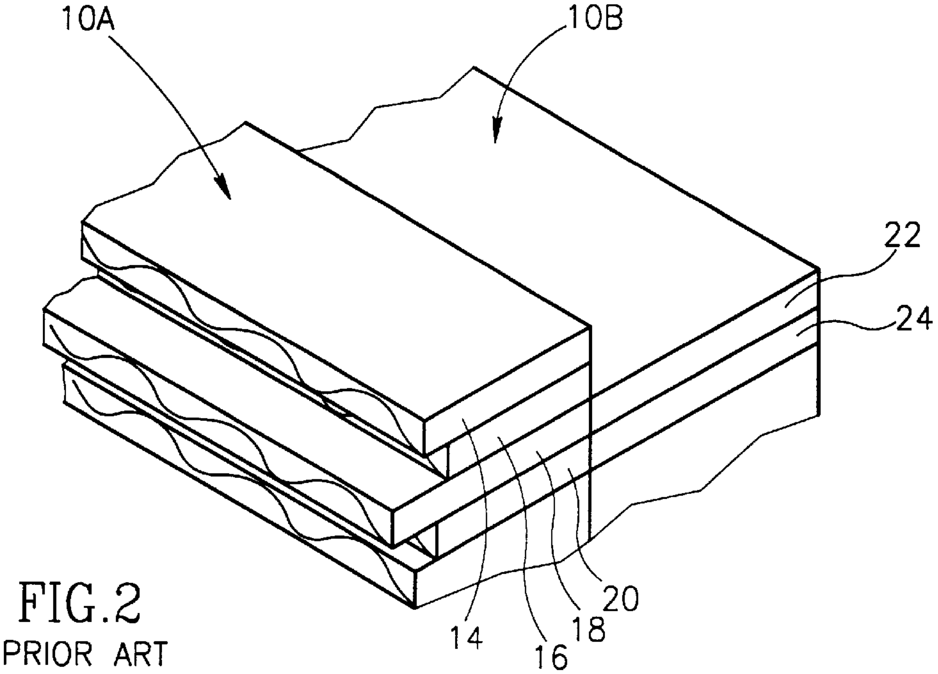
FIG.2 PRIOR ART
FIG. 2 is an enlarged detail of corrugated boards at the top of a stack of boards.
Figure 3:
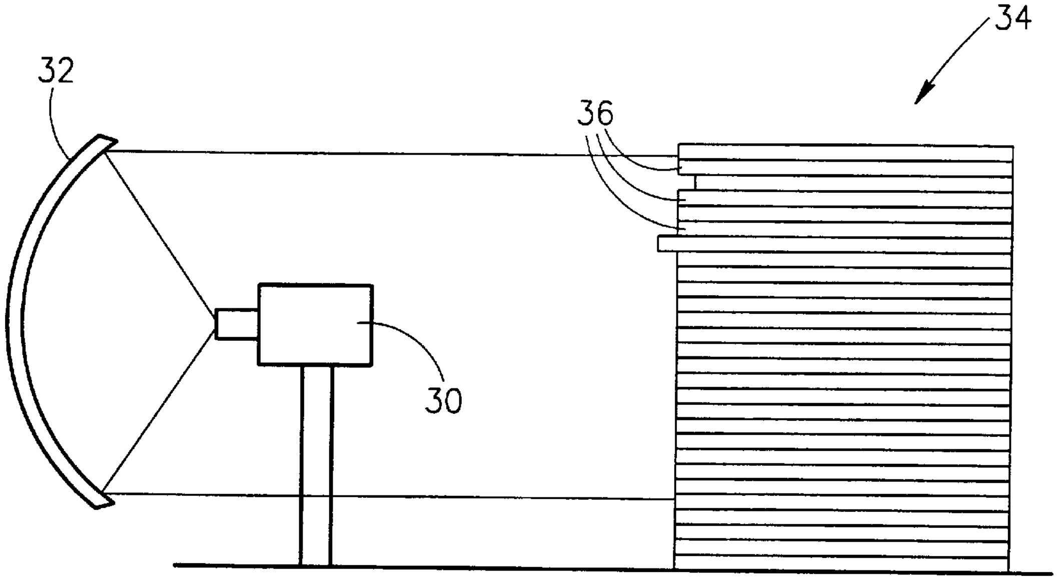
FIG.3 PRIOR ART
FIG. 3 is a schematic illustration of a prior art system for scanning a plurality of corrugated boards.

The production line 40 of FIG. 5 is similar to the line, described hereinabove with respect to FIG. 1. That is, the production line 40 comprises a plurality of stacks, referenced 10A, 10B and 10C, of manufactured boards, generally designated 12. In the example of FIG. 5 (similar to FIG. 1), stack 10A, contains more boards than stack 10B and stack 10C contains more boards than 10A.

The board counting system, illustrated in FIG. 5, is similar to the elements which have been previously described hereinabove, with respect to the preferred embodiment of FIG. 4. That is, the board counting system comprises a imaging device 50, attached to a moveable carriage 52, and a processing unit 54 coupled to imaging device 50. Production line 40 moves in a generally longitudinal direction, indicated by arrow 56 and imaging device 50 scans the proximate stack of boards 10A as carriage 52 is actuated to move downwards (arrow 58) along stand 60. Similar elements are similarly designated and will not be further described.

The embodiment of FIG. 5 further comprises a height sensor, generally designated 70, schematically shown located above the stacks 10A, 10B and 10C. Height sensor 70 is any suitable sensing device, known in the art, capable of high resolution and accurate measurement, to determine the difference in the heights of the stacks 10A, 10B and 10C. An exemplary sensor is a semiconductor laser displacement sensor, such as the LB series, manufactured by Keyence Corp. of Osaka, Japan. The LB laser displacement sensor also has a wide measuring range eliminating the need to reposition the sensor head for the various stacks of boards.

Alternatively, the height differences between the stacks 10A, 10B and 10C, may be determined by an ultrasonic sensor, such as the MIC-30I/U, manufactured by "Microsonic Gmbh" of Dortmund, Germany. The MIC-30I/U uses a narrow ultrasonic beam to emit short burst impulses. The time taken for the impulse to return is used to calculate the distance to the detected object.

Height sensor 70 can be actuated to move in a generally horizontal direction (indicated by arrow 72, perpendicular to the longitudinal direction of the moving stacks (arrow 56).

Knowing the initial number of boards in stack 10A from the imaging carried out by imaging device 50, and the height of a standard corrugated board 12, it is thus possible, by reference to the differential readings for each of the stacks 10A, 10B and 10C, to also accurately ascertain the number of boards in stacks 10B and 10C.

It will be appreciated by persons skilled in the art that the invention is applicable to any type of board having a characteristic configuration and not restricted to stacks of corrugated boards. Furthermore, the invention is applicable to boards stacked horizontally, in which case, the imaging device would scan in a generally horizontal direction to identify the characteristic configuration of the boards. Additionally, the invention is applicable to static stacks of items as well as items on a production line.

It will be appreciated by persons skilled in the art that the present invention is not limited by what has been particularly shown and described herein above. Rather the scope of the invention is defined by the claims which follow:

What is claimed is:

1. A system for determining the number of boards within a stack of boards, the system comprising:

a) a device in communication with a moveable carriage, said device being actuated to move to produce an image of the full stack of boards, each of said boards having a characteristic corrugated configuration; and b) a processing unit, coupled to said device, for identifying the characteristic corrugated configuration of each of the full stack of boards from said image and for determining from said characteristic corrugated configuration the number of corrugated boards within the stack.

2. A system according to claim 1 wherein said stack of boards are moving along a production line.

3. A system according to claim 1 wherein boards are corrugated boards and said common characteristic configuration is at least one sine-wave.

4. A system according to claim 2 wherein the movement of said imaging device is coordinated with the movement of said production line.

5. A system according to claim 1 wherein the movement of said imaging device is generally perpendicular to the stack of boards.

6. A system for determining the number of boards within each of a plurality of stacks of boards adjacent to each other, the system comprising:

a) a device in communication with a moveable carriage, said device being actuated to produce an image of the full stack of one of the plurality of stacks of boards, each of said boards having a characteristic corrugated configuration;

b) a processing unit, coupled to said device, for identifying the characteristic corrugated configuration of each of the full stack of boards from said image and for determining from said characteristic corrugated configuration the number of corrugated boards within each of the stacks; and c) a height sensor coupled to said processing unit, for determining the height of each of said plurality of stacks of boards.

7. A system according to claim 6 wherein said plurality of stacks of boards are moving along a production line.

8. A system according to claim 7 and wherein said height sensor is actuated to move in a direction, perpendicular to the direction of movement of said production line.

9. A system according to claim 7 and wherein the movement of said imaging device is coordinated with the movement of said production line.

10. A system according to claim 6 and wherein said plurality of boards are corrugated boards and said common characteristic configuration is at least one sine-wave.

11. A system according claim 6 and wherein said height sensor is a laser displacement sensor.

12. A system according to claim 6 and wherein said height sensor is an ultrasonic sensor.

13. A system according to claim 6 wherein the movement of said imaging device is generally perpendicular to the plurality of said stack of boards.

14. A system according to claim 1 wherein said imaging device is a charge coupled device (CCD) camera.

15. A method for determining the number of boards within a stack of boards, each board having a common characteristic corrugated configuration, the method comprising the steps of:

producing an image of the full stack of boards;

identifying said characteristic corrugated configuration for each of the full stack of boards; and determining from said characteristic corrugated configuration the number of corrugated boards within the stack.

16. A method according to claim 15 and further comprising the step of measuring the height of said imaged stack of boards.

17. A method for determining the number of boards within each of a plurality of stacks of boards adjacent to each other, each board having a common characteristic corrugated configuration, the method comprising the steps of:

producing an image of the full stack of boards;

identifying said characteristic corrugated configuration for each of the full stack of boards;

counting the number of corrugated boards within the full stack of boards;

measuring the height of each of said plurality of stacks of boards; and comparing the measured heights of each of said plurality of stacks of boards to count the number of boards within each of said adjacent stacks of boards.

18. A method according to claim 15 and further comprising the step of coordinating the movement of the imaging device.

* * * * *